United States Patent
Deshmukh et al.

(10) Patent No.: US 10,705,917 B2
(45) Date of Patent: Jul. 7, 2020

(54) CONSOLIDATED FULL BACKUP OF A RESTORED VIRTUAL MACHINE

(71) Applicant: Veritas Technologies LLC, Mountain View, CA (US)

(72) Inventors: Dulipsinh Deshmukh, Maharashtra (IN); James Olson, Afton, MN (US); Atul Akolkar, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 499 days.

(21) Appl. No.: 14/838,622

(22) Filed: Aug. 28, 2015

(65) Prior Publication Data

US 2017/0004047 A1    Jan. 5, 2017

(30) Foreign Application Priority Data

Jun. 30, 2015    (IN) .......................... 2484/MUM/2015

(51) Int. Cl.
*G06F 11/14*    (2006.01)
*G06F 9/455*    (2018.01)

(52) U.S. Cl.
CPC ...... *G06F 11/1448* (2013.01); *G06F 9/45558* (2013.01); *G06F 2009/45562* (2013.01); *G06F 2201/80* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,326,803 | B1* | 12/2012 | Stringham | G06F 3/0619 707/652 |
| 9,152,507 | B1* | 10/2015 | Bushman | G06F 11/1469 |
| 9,965,357 | B1* | 5/2018 | Earl | G06F 11/1451 |
| 2007/0239949 | A1* | 10/2007 | Childs | G06F 11/1464 711/162 |
| 2009/0217255 | A1* | 8/2009 | Troan | G06F 8/65 717/168 |
| 2010/0262586 | A1* | 10/2010 | Rosikiewicz | G06F 11/1469 707/679 |
| 2016/0147607 | A1* | 5/2016 | Dornemann | G06F 11/1435 711/162 |
| 2016/0314046 | A1* | 10/2016 | Kumarasamy | G06F 11/1435 |
| 2017/0060699 | A1* | 3/2017 | Hohl | G06F 16/27 |

* cited by examiner

*Primary Examiner* — Giuseppi Giuliani
(74) *Attorney, Agent, or Firm* — Campbell Stephenson LLP

(57) ABSTRACT

Various systems, methods, and processes for optimizing the performance of a consolidated full backup of a restored virtual machine are disclosed. Changed data and metadata associated with the changed data is received from a hypervisor at a backup module. The hypervisor supports a virtual machine, and the virtual machine employs virtual disks. A confirmation is sent to the hypervisor from the backup module indicating that a full backup of the virtual disks has been created.

20 Claims, 12 Drawing Sheets

CONSOLIDATED FULL BACKUP OF A RESTORED VIRTUAL MACHINE

CROSS-REFERENCE TO RELATED APPLICATIONS

This application claims benefit under 35 U.S.C. § 119(a) of pending India, Provisional Patent Application No. 2484/MUM/2015, filed on Jun. 30, 2015, entitled "Consolidated Full Backup of a Restored Virtual Machine." The above-referenced application is hereby incorporated by reference in its entirety.

FIELD OF THE DISCLOSURE

This invention relates to data backup operations and, more particularly, to optimizing the performance of a consolidated full backup of a restored virtual machine.

DESCRIPTION OF THE RELATED ART

A restore operation can be performed to restore a virtual machine from an original full backup image. The original full backup image contains virtual machine data associated with the virtual machine at the time the virtual machine was restored. Existing backup systems and applications designate a restored virtual machine as a new virtual machine after restoration.

Therefore, after a virtual machine is restored, and the virtual machine data associated with the virtual machine has to be backed up again in its entirety, existing backup systems and applications perform a full backup operation to produce a full backup set or a copy of all virtual machine data—data that has changed as well as data that is unchanged. However, backing up a copy of all virtual machine data may be redundant if unchanged data, that is part of the copy of all virtual machine data, already exists in the original full backup image (from which the virtual machine is restored).

SUMMARY OF THE DISCLOSURE

Various systems, methods, and processes for optimizing the performance of a consolidated full backup of a restored virtual machine are disclosed. One such method involves receiving one or more units of changed data and metadata associated with the one or more units of changed data from a hypervisor at a backup module. In this example, the hypervisor supports a virtual machine, and the virtual machine employs one or more virtual disks. The method also involves sending a confirmation to the hypervisor from the backup module indicating that a full backup of the one or more virtual disks has been created.

In one embodiment, the method identifies the one or more units of changed data using a changed block tracker. In this example, the hypervisor implements the changed block tracker, and the changed block tracker determines that the one or more units of changed data have been modified by the virtual machine. The method then stores the metadata associated with the one or more units of changed data in the hypervisor.

In another embodiment, the method performs a restore operation prior to the receiving the one or more units of changed data, and the metadata associated with the one or more units of changed data from the hypervisor at the media server. The restore operation involves restoring the virtual machine from an original full backup image stored on the media server, and storing a catalog and a state file associated with the virtual machine on the media server as part of the restore operation. The restore operation also includes enabling the changed block tracker on the hypervisor. In this example, the changed block tracker is enabled after completion of the restore operation, and prior to initiating execution of the virtual machine.

In some embodiments, the method creates or produces a consolidated full backup by generating a snapshot of the virtual machine, accessing the catalog and the state file on the media server, and generating backup metadata from the catalog and the state file. The consolidated full backup is created by combining the one or more units of changed data transmitted from the hypervisor, and one or more units of unchanged data from the original full backup image, which in this example, is identified by the backup metadata. The backup metadata includes information used to restore the virtual machine stored in the catalog, and a state of the virtual machine at a time the restore is performed stored in the state file, and the unchanged data on the original full backup image is identified by comparing the snapshot of the virtual machine taken after the restore operation and the catalog stored as part of the restore operation.

In other embodiments, the method deletes the original full backup image after creating the consolidated full backup, and designates the consolidated full backup as a new full backup image to be used for a subsequent restore operation.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
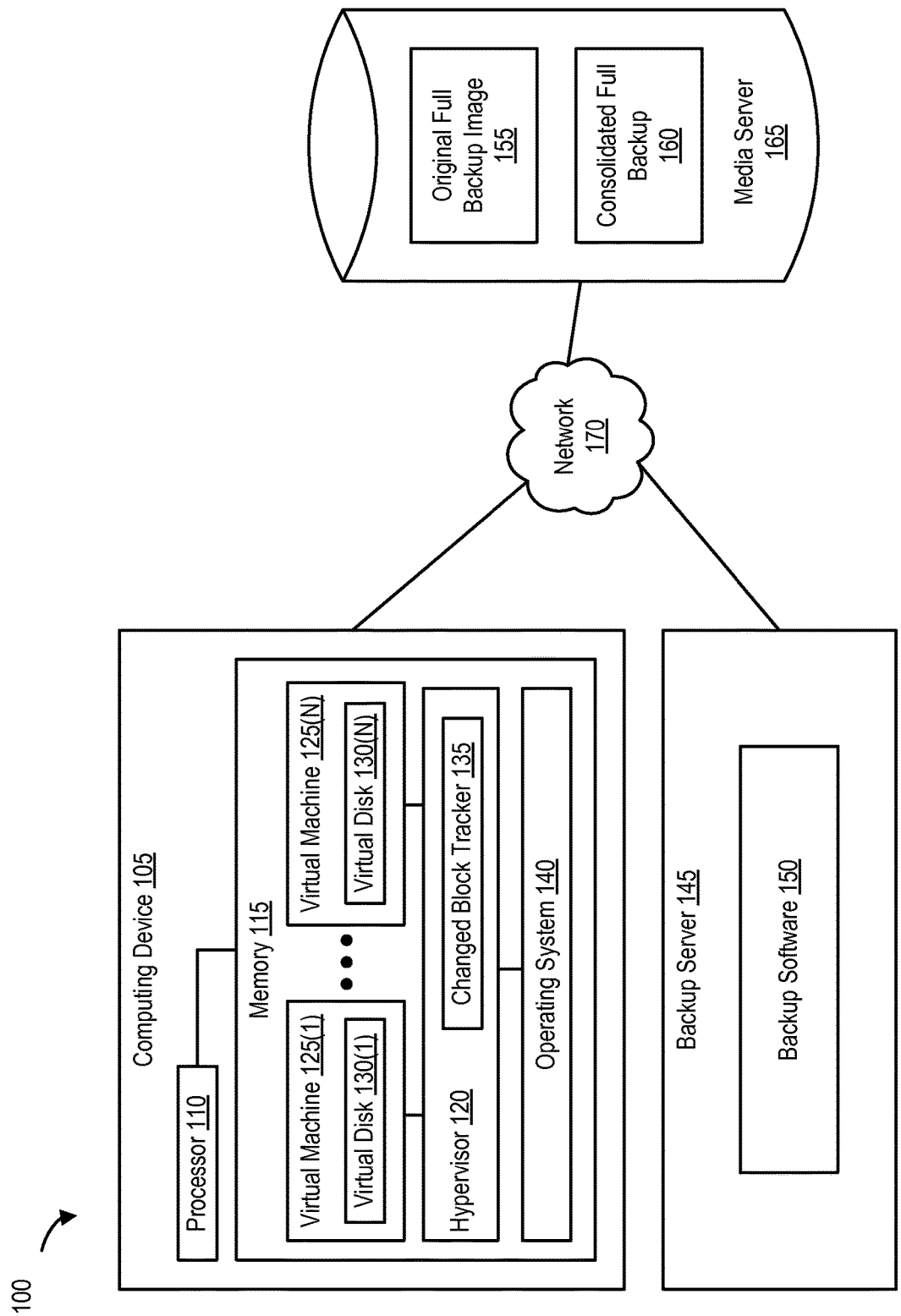
FIG. 1 is a block diagram of a computing system which can implement a backup software, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A restore operation is a process that involves copying backup files (or units of data) from secondary storage (e.g., a media server) to primary storage (e.g., a hard disk or some other local storage device). A restore operation is typically performed to return data to the data's original condition if files have become damaged, or to copy or move data to a new location.

A virtual machine can be restored to the virtual machine's original location or to a new location. For example, a virtual machine may lose access to virtual machine data if a local hard disk or a virtualization server that implements the virtual machine experiences a failure of some kind. In addition, the virtual machine may also have to be shut down and rebooted for a variety of reasons. In such situations, the virtual machine can be restored to the virtual machine's original location (e.g., to the same virtualization server that originally implemented the virtual machine) or to some other location (e.g., to another virtualization server).

Restoration of a virtual machine requires an original full backup image. Such original full backup images are typically stored on secondary storage devices called media servers. The original full backup image contains virtual machine data as well as virtual machine metadata, and can be used to restore the virtual machine to a state in which the virtual machine existed at a time when the original full backup image was created.

After a virtual machine is restored, the virtual machine can make changes (or modifications) to virtual machine data. Therefore, companies and/or organizations using such virtual machines may need to create a full backup of the virtual machine after a given time after the virtual machine has been restored. However, existing backup systems and backup applications designate a restored virtual machine as a new virtual machine after restoration.

Therefore, when a restored virtual machine has to backed up again in its entirety after being restored, existing backup systems and backup applications perform a full backup operation to produce a full backup set or a copy of all virtual machine data—data that has changed as well as data that is unchanged. However, backing up a copy of all virtual machine data may prove redundant, particularly if unchanged data that is part of the copy of all virtual machine data already exists in the original full backup image (from which the virtual machine is restored). In addition, sending the copy of all virtual machine data over a network to be backed up at a media server is not only slow, but also consumes significant network and computing resources.

Disclosed herein are systems, methods, and processes to optimize the creation of consolidated full backups of restored virtual machines.

Systems to Create a Consolidated Full Backup of a Restored Virtual Machine

FIG. 1 is a block diagram of a computing system which implements a computing device 105, a backup server 145, and a media server 165, according to one embodiment. Computing device 105, backup server 145, and media server 165 are communicatively coupled via network 170 (any other appropriate network or interconnection can be used instead of and/or in addition to network 170). The computing system of FIG. 1 can be configured to create a consolidated full backup of a restored virtual machine, for example, by using backup software 150 implemented by backup server 145. Backup software 150 such as the one shown in FIG. 1, is available from Symantec Corporation of Mountain View, Calif.

Also as shown in FIG. 1, computing device 105 includes a processor and a memory 115. Memory 115 implements one or more virtual machines (e.g., virtual machines 125(1)-(N)), a hypervisor 120, and an operating system 140. Hypervisor 120 runs (and supports) virtual machines 125(1)-(N), and virtual machines 125(1)-(N) each employ one or more virtual disks (e.g., virtual disks 130(1)-(N)). As shown in FIG. 1, hypervisor 120 also implements a changed block tracker 135.

Media server 165, as shown in FIG. 1, is a storage device and can include one or more of a variety of different storage devices, including hard drives, compact discs, digital versatile discs, solid state drives (SSD), memory such as Flash memory, or an array, and the like. As shown in FIG. 1, media server 165 stores an original full backup image 155, and also stores a consolidated full backup 160.

In one embodiment, hypervisor 120 is a native or bare-metal hypervisor such as ESXi, provided by VMware™, Inc, Hyper-V provided by Microsoft® Corporation, etc. In another embodiment, hypervisor 120 can be implemented using software such as Red Hat® Enterprise Virtualization. In some embodiments, hypervisor 120 uses Copy on Write 2 (QCOW2) to implement virtual disks 130(1)-(N) used by virtual machines 125(1)-(N). Other embodiments can implement a different number of virtual machines per computing device, and a virtualization system can include additional computing devices that each implement the same or different number of virtual machines within the same virtualization system.

Figure 2:
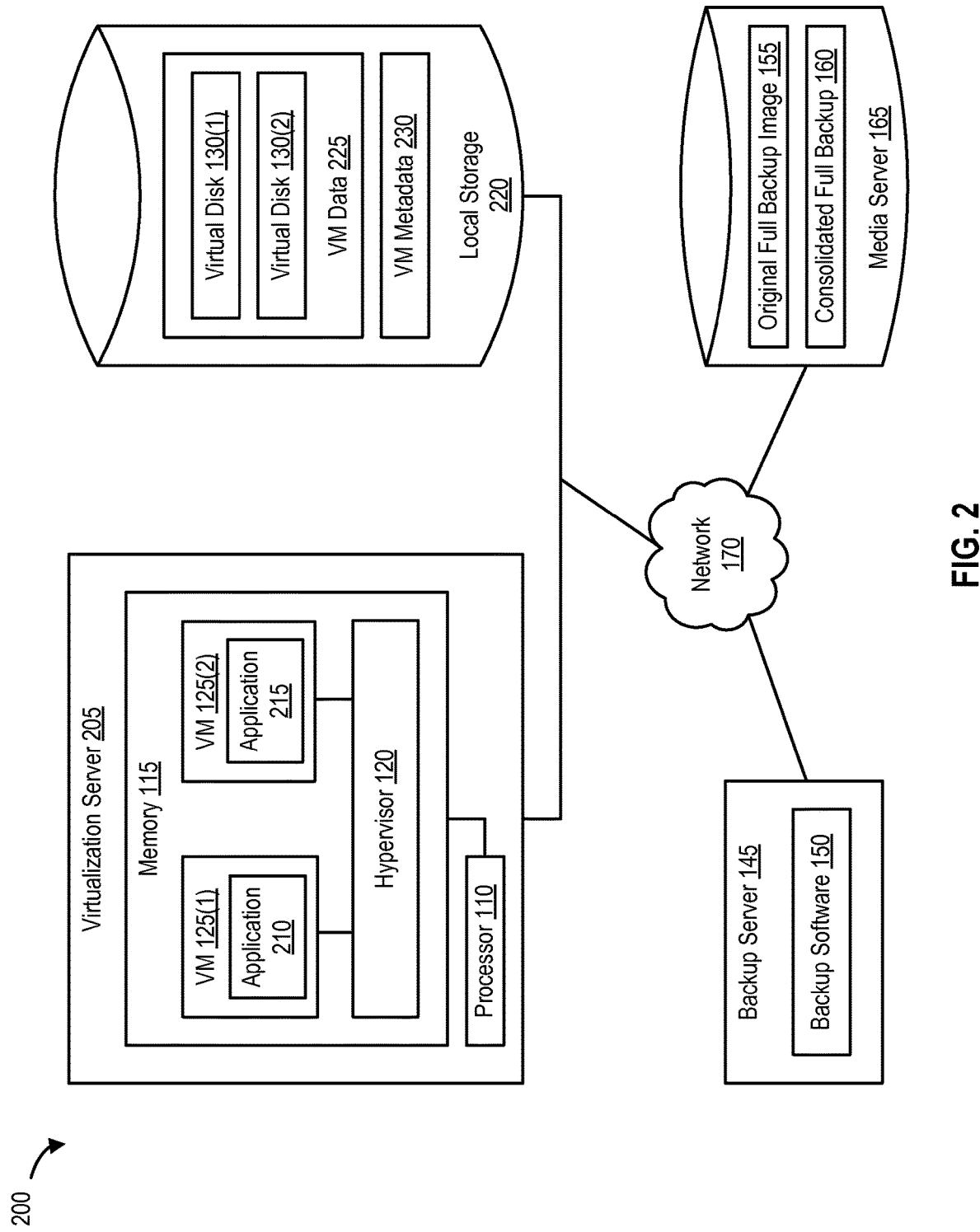
FIG. 2 is a block diagram of a computing system which can implement one or more restored virtual machines, according to one embodiment of the present disclosure.

As noted above, one or more virtual machines can be restored (to their original location or to an alternate location) from an original full backup image (e.g., original full backup image 155). FIG. 2 is a block diagram of a computing system that illustrates virtual machines 125(1) and 125(2) that have been restored to a virtualization server 205 from original full backup image 155, according to one embodiment. Virtual machines 125(1) and 125(2) execute applications 210 and 215 respectively. Virtual machine data created and/or modified by virtual machines 125(1) and 125(2) (e.g., data associated with applications 210 and 215) can be stored on either virtual disk 130(1) or 130(2), or on both virtual disks 130(1) and 130(2), respectively.

FIG. 2 also includes a local storage 220 that stores the virtual machine data (e.g., VM data 225, which includes the virtual machine data from virtual disks 130(1) and 130(2)), as well as virtual machine metadata (e.g., VM metadata 230, which can also include the state information of virtual machines 125(1) and 125(2)). VM metadata 230 contains information about the units of data in VM data 230 (e.g., the identity and location of units of data that have been changed and/or modified by virtual machines 125(1) and 125(2), units of unchanged data, and also new units of data that have been created by virtual machines 125(1) and 125(2) in the form of a header, a tail, a backupID, an offset, a unit of data size, etc.).

Backup server 145 is configured to backup virtual machines 125(1) and 125(2) by copying the virtual disks used by virtual machines 125(1) and 125(2) to media server 165. After virtual machines 125(1) and 125(2) have been restored from original full backup image 155, virtual machines 125(1) and 125(2) may create and/or modify one or more units of data, for example, as part of their role in executing applications 210 and 215, respectively.

In one embodiment, backup server 145 (e.g., using backup software 150) transfers one or more units of changed data as well as metadata associated with one or more units of changed data from hypervisor 120 to backup module 340 (in media server 165). In this example, after the transfer of the one or more units of changed data as well as the metadata associated with the one or more units of changed data from hypervisor 120 to backup module 340, a confirmation is received at hypervisor 120 from backup module 340 that a full backup of one or more virtual disks has been created (e.g., virtual disks 130(1) and/or 130(2)).

Figure 3:
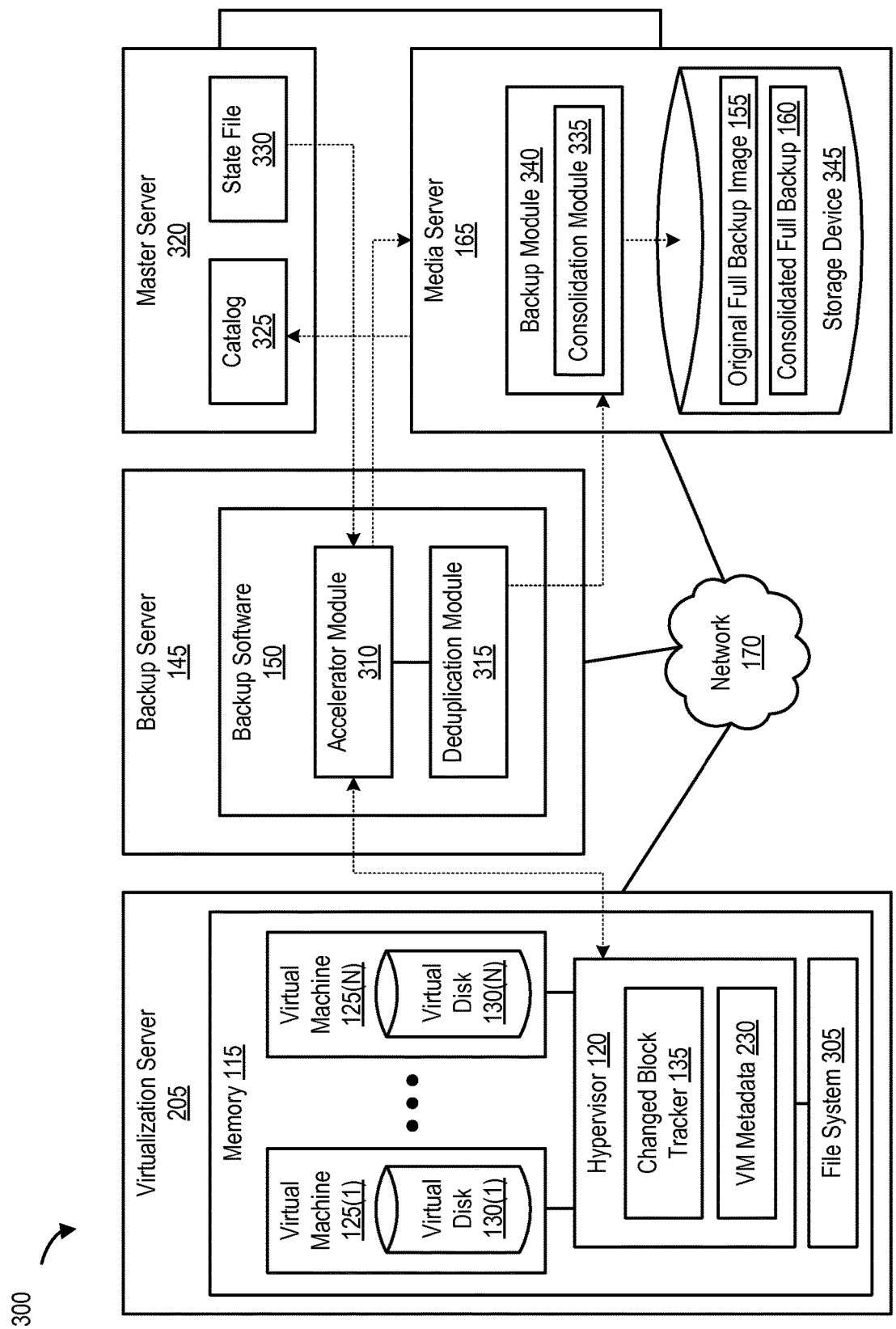
FIG. 3 is a block diagram of a computing system which can implement a backup module, according to one embodiment of the present disclosure.

FIG. 3 is a block diagram of a computing system that can create a consolidated full backup of a restored virtual machine, according to one embodiment. FIG. 3 includes virtualization server 205, backup server 145, a master server 320, and media server 165. Virtualization server 205 implements virtual machines 125(1)-(N), and includes a changed block tracker 135 and a file system 305. Backup server 145 includes an accelerator module 310 and a deduplication module 315. Master server 320 includes a catalog 325 and a state file 330. Media server 165 includes backup module 340 which implements consolidation module 335. Backup module 340 is coupled to a storage device 345, which can be used to store one or more backup images (e.g., original full backup image 155 and consolidated full backup 160).

State file 330 stores information about each unit of data (e.g., about each extent of data on a virtual disk). It should be noted that VM metadata 230 also stores state information for each virtual machine after that virtual machine is restored. State file 330 can be maintained on media server 165 or at any location in the computing systems of FIGS. 1, 2, and 3. In addition, catalog 325 identifies the contents of each backup on media server 165 (e.g., the contents of original full backup image 155) such that original full backup image 155 can be used to restore virtual machines 125(1)-(N) to any desired point-in-time represented by original full backup image 155 by restoring the virtual disks used by virtual machines 125(1)-(N).

To create a consolidated full backup of one or more restored virtual machines, accelerator module 310 first requests and obtained units of changed data (e.g., for each virtual disk included in the backup operation) from virtual machines 125(1)-(N). Hypervisor 120 can track units of changed data (e.g., disk sectors) using changed block tracker 135, for example. Once identified, the units of changed data from hypervisor 120 are sent to backup module 340.

Next, state file 330, which stores information about each unit of data (e.g., about each extent block or other unit of data on a virtual disk), is obtained and/or retrieved from master server 320. In some embodiments, state file 330 can be made available on backup server 145, which in this example, functions as a virtual machine proxy host and/or backup host. State file 330 includes information about units of data which are already part of original full backup image 165 (e.g., units of data from which have been previously backed up by backup module 340 as original full backup image 165, from which virtual machines 125(1)-(N) are restored).

Based on the information in state file 330, consolidation module 335 consolidates units of changed data with a list of units of data that are part of original full backup image 165. Accelerator 330 initially transfers only units of changed data to deduplication module 315. Once units of changed data are deduplicated (e.g., to deduplicate multiple units of data that are modified similarly), a consolidated full backup (e.g., consolidated full backup 160) is generated on media server 165 (e.g., using consolidation module 335). State file 330 is then updated by media server 165 and transferred to master server 320 after the backup of each virtual disk is completed. In some embodiments, hypervisor 120 can send the units of changed data and metadata associated with the units of changed data directly to media server 165 (e.g., to consolidation module 335) to create consolidated full backup 160. In this example, consolidation module 335 simply retrieves any units of data not sent by hypervisor 120 from original full backup image 155 (e.g., based on state file 330), and creates consolidated full backup 160.

Figure 4:
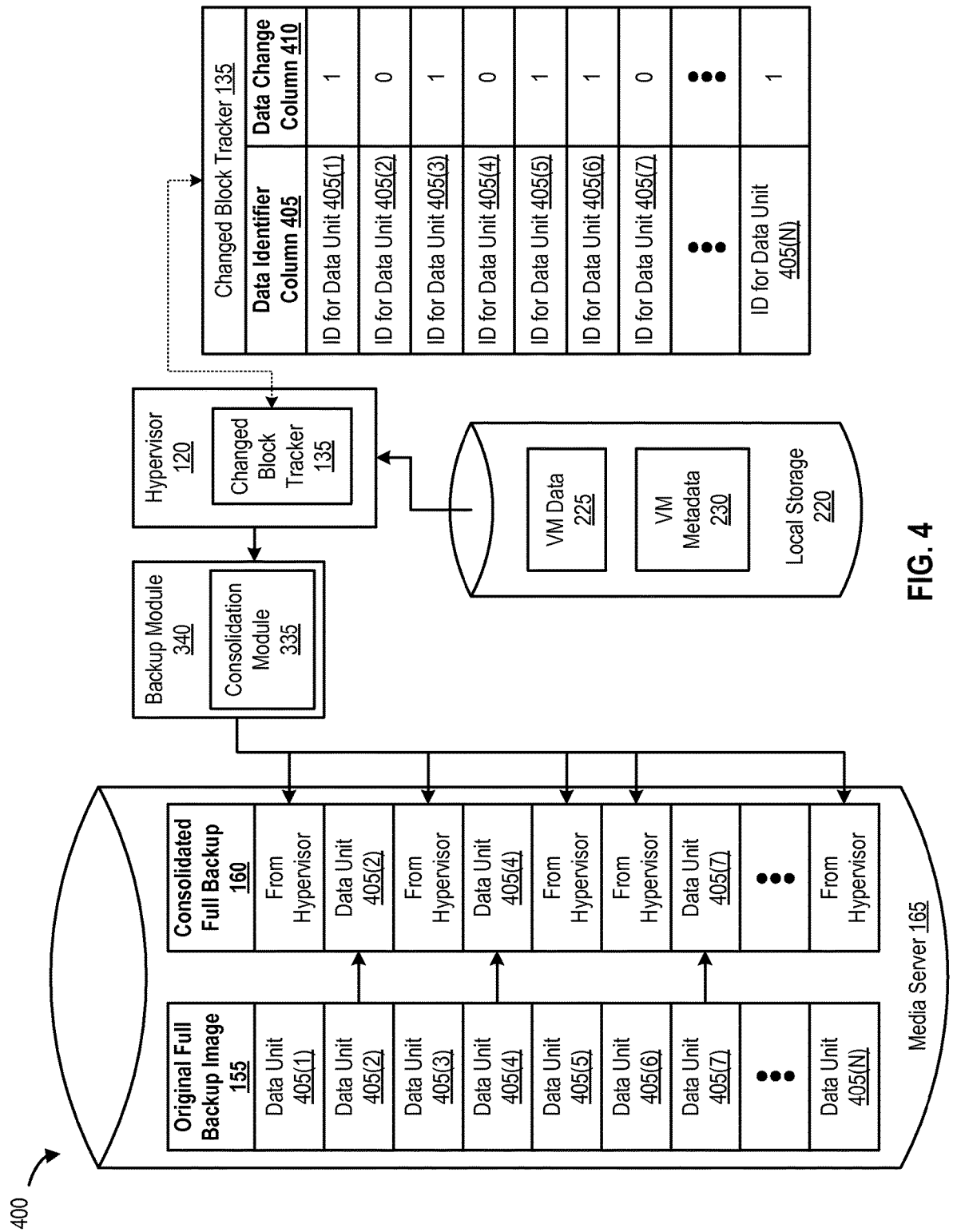
FIG. 4 is a block diagram that illustrates a media server and a change block tracker, according to one embodiment of the present disclosure.

FIG. 4 is a block diagram that illustrates the creation of a consolidated full backup using data received from a hypervisor, and units of changed data identified by a changed block tracker, according to one embodiment. As previously noted, changed block tracker 135 can be used to identify one or more units of data that have been changed and/or modified by virtual machines 125(1)-(N). Therefore, in one embodiment, backup software 150 identifies the one or more units of changed data (e.g., data unit 405(1), data unit 405(3), data unit 405(5), data unit 405(6), and data unit 405(N) as shown in FIG. 4) using changed block tracker 135. When accessed, changed block tracker 135 determines that the one or more units of changed data have been modified by virtual machines 125(1)-(N). Backup software 150 also stores metadata associated with the one of more units of changed data in hypervisor 120.

In some embodiments, virtual machines 125(1)-(N) are restored prior to backup module 340 receiving the one or more units of changed data and the metadata associated with the one or more units of changed data from hypervisor 120. The restore operation involves restoring one or more virtual machines (e.g., virtual machines 125(1) and 125(2) as shown in FIG. 2) from original full backup image 155. In this example, catalog 325 and state file 330 associated with the restored virtual machines can be stored on media server 165 (e.g., instead of master server 320 as shown in FIG. 3).

Changed block tracker 135 is also enabled by (and on) hypervisor 120 as part of the restore operation, although changed block tracker 135 is enabled after completion of the restore operation, and prior to initiating execution of the restored virtual machine(s) (e.g., prior to booting up the restored virtual machine(s)).

Backup software 150 executing on backup server 145 can also be used to create or produce a consolidated full backup of restored virtual machines. In one embodiment, backup software 150 first generates a snapshot of the one or more virtual machines to be backed up. Then, backup software 150 accesses a catalog and a state file (which can be stored on media server 165 or elsewhere), and generates backup metadata from the catalog and the state file.

The consolidated full backup (e.g., consolidated full backup 160) is created by combining the one or more units of changed data transmitted from the hypervisor 120, and one or more units of unchanged data from original full backup image 155 (as shown in FIG. 4), which in this example, is identified by the backup metadata. The unchanged data on original full backup image 155 is identified by comparing the snapshot of the virtual machine(s) taken after the restore operation, and the catalog stored as part of the restore operation. In this example, the backup metadata includes information used to restore the virtual machine(s) (e.g., stored in catalog 325 and as part of VM metadata 230), as well as a state of the virtual machine(s) at a time the restore operation is performed (e.g., stored in state file 330).

In one embodiment, backup software 150 deletes original full backup image 155 after creating consolidated full backup 160, and designates consolidated full backup 160 as a new full backup image to be used for a subsequent restore operation.

Processes to Create a Consolidated Full Backup of a Restored Virtual Machine

Figure 5A:
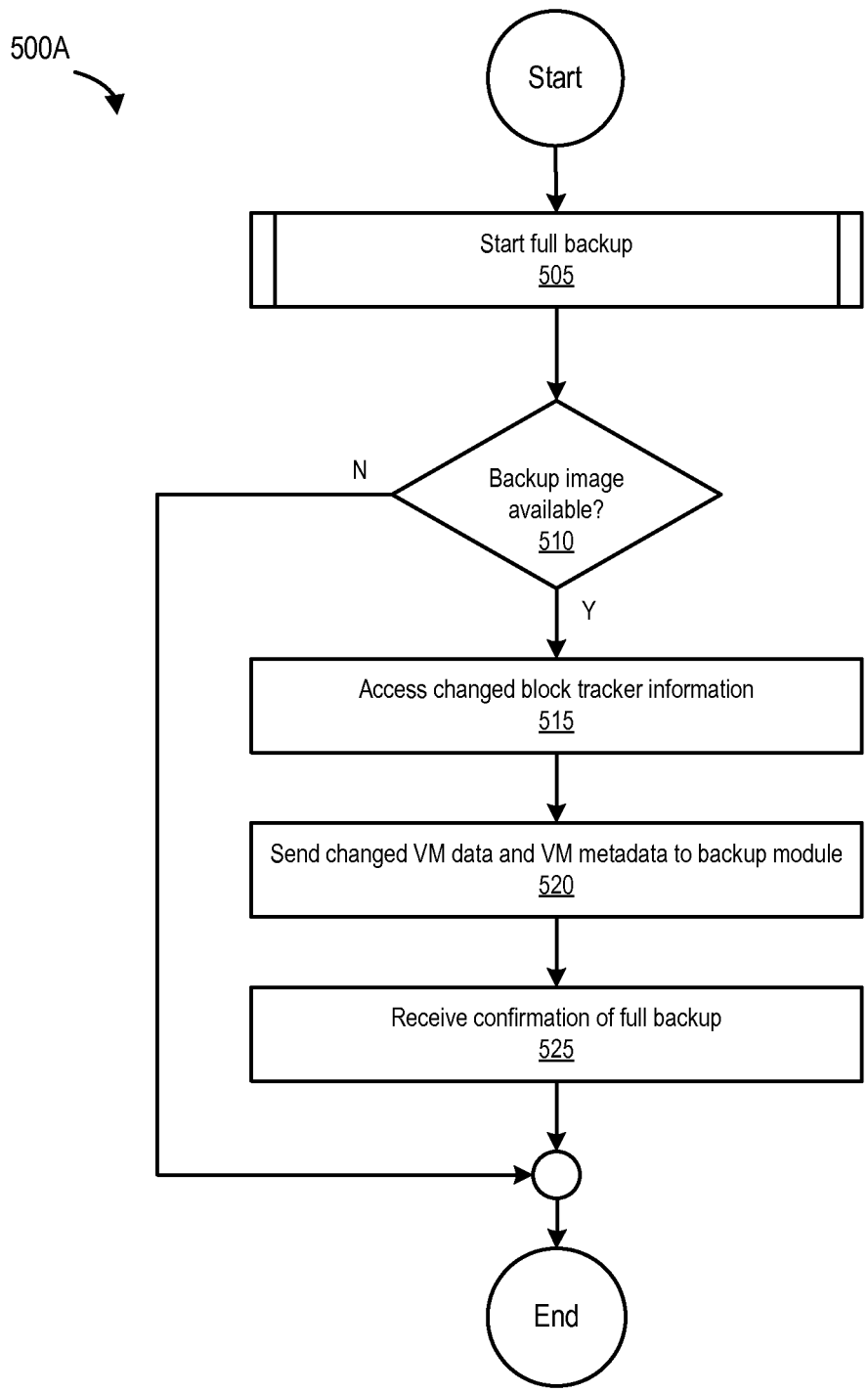
FIG. 5A is a flowchart that illustrates a process for receiving confirmation of a full backup, according to one embodiment of the present disclosure.

FIG. 5A is a flowchart that illustrates a process for receiving confirmation of a full backup (e.g., at a hypervisor), according to one embodiment. The process begins at 505 by starting a full backup (e.g., a full backup of a restored virtual machine). At 510, the process determines whether a backup image is available (e.g., original full backup image 155). If a backup image is available, the process, at 515, accesses changed block tracker information. At 520, the process sends changed VM data (e.g., VM data 225) and VM metadata (e.g., VM metadata 230) to backup module 340 (e.g., from hypervisor 120). At 525, the process receives confirmation of a full backup (e.g., at hypervisor 120 or at backup server 145).

Figure 5B:
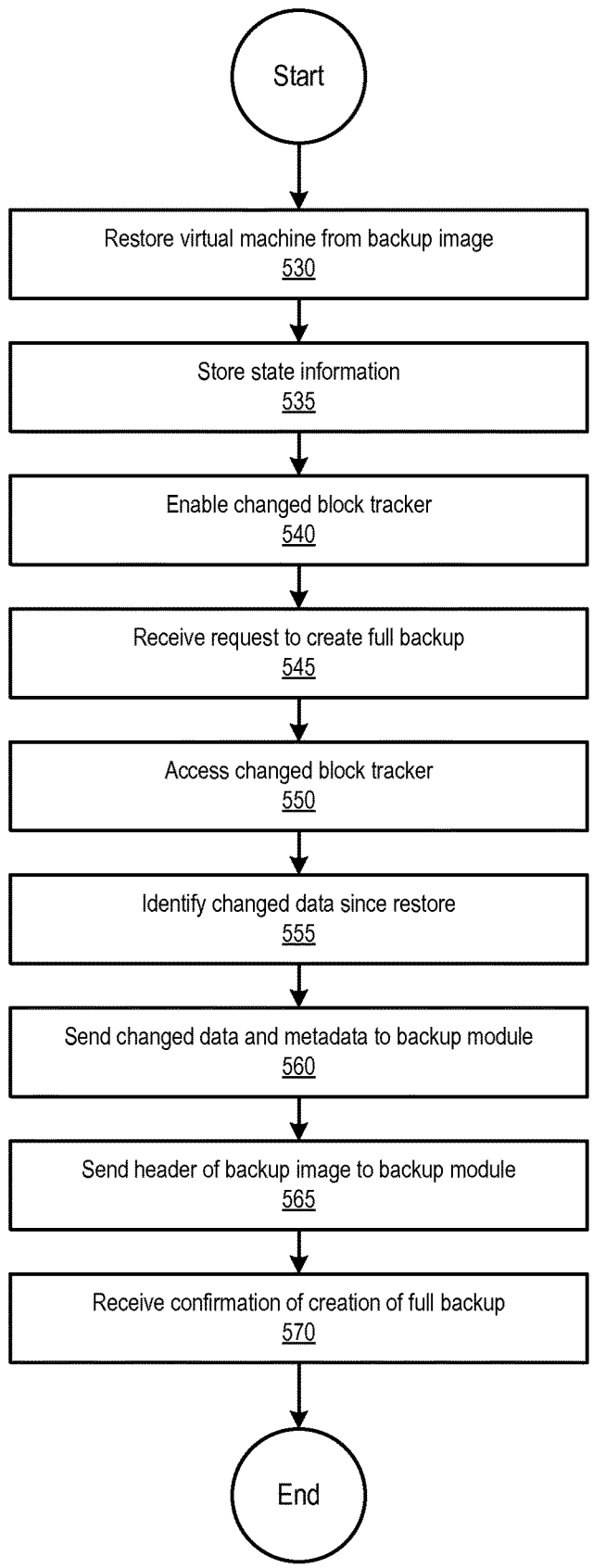
FIG. 5B is a flowchart that illustrates another process for receiving confirmation of a full backup, according to one embodiment of the present disclosure.

FIG. 5B is a flowchart that illustrates another process for receiving confirmation of a full backup, according to another embodiment. The process begins at 530 by restoring a virtual machine from a backup image (e.g., virtual machine 125(1) from original full backup image 155). At 535, the process stores state information (e.g., in state file 330). At 540, changed block tracker 135 is enabled. In this example, changed block tracker 135 can be enabled on hypervisor 120 either by hypervisor 120 itself or by backup software 150. As noted previously, the changed block tracker is enabled after the restore process is complete, but before the initiation of the virtual machine is executed (e.g., before the virtual machine is booted up after being restored).

At 545, the process receives a request to create a full backup. This request can come from hypervisor 120, an IT administrator and/or user of computing system 105, and/or can be a regularly scheduled backup managed by backup server 145. At 550, the process accesses the changed block tracker. At 555, the process identifies changed data since the virtual machine has been restored (e.g., based on changed block tracker 135 as shown in FIG. 4). At 560, the process sends changed data and metadata to backup module 340. It is noted that the metadata that is sent to backup module 340 as part of this process can include metadata of units of changed data, or metadata of all units of data. If the process sends metadata of all units of data, the metadata can be compared with the changed data sent by the process to determine the unchanged data that is still available from original full backup image 155.

At 656, the process sends header information of the backup image to backup module 340. In this example, the header information identifies units of data that are available in original full backup image 165 such that the process only requires the changed data (and associated metadata) sent in 560 to create a consolidated full backup. The process ends at 570 by receiving confirmation (e.g., from backup module 340) of the creation of a full backup. It should be noted that although media server 165 creates a consolidated full backup, the confirmation that is received (e.g., by hypervisor 120 or backup server 145) indicates that a full backup has been created in media server 165 of all virtual machine data.

Figure 6A:
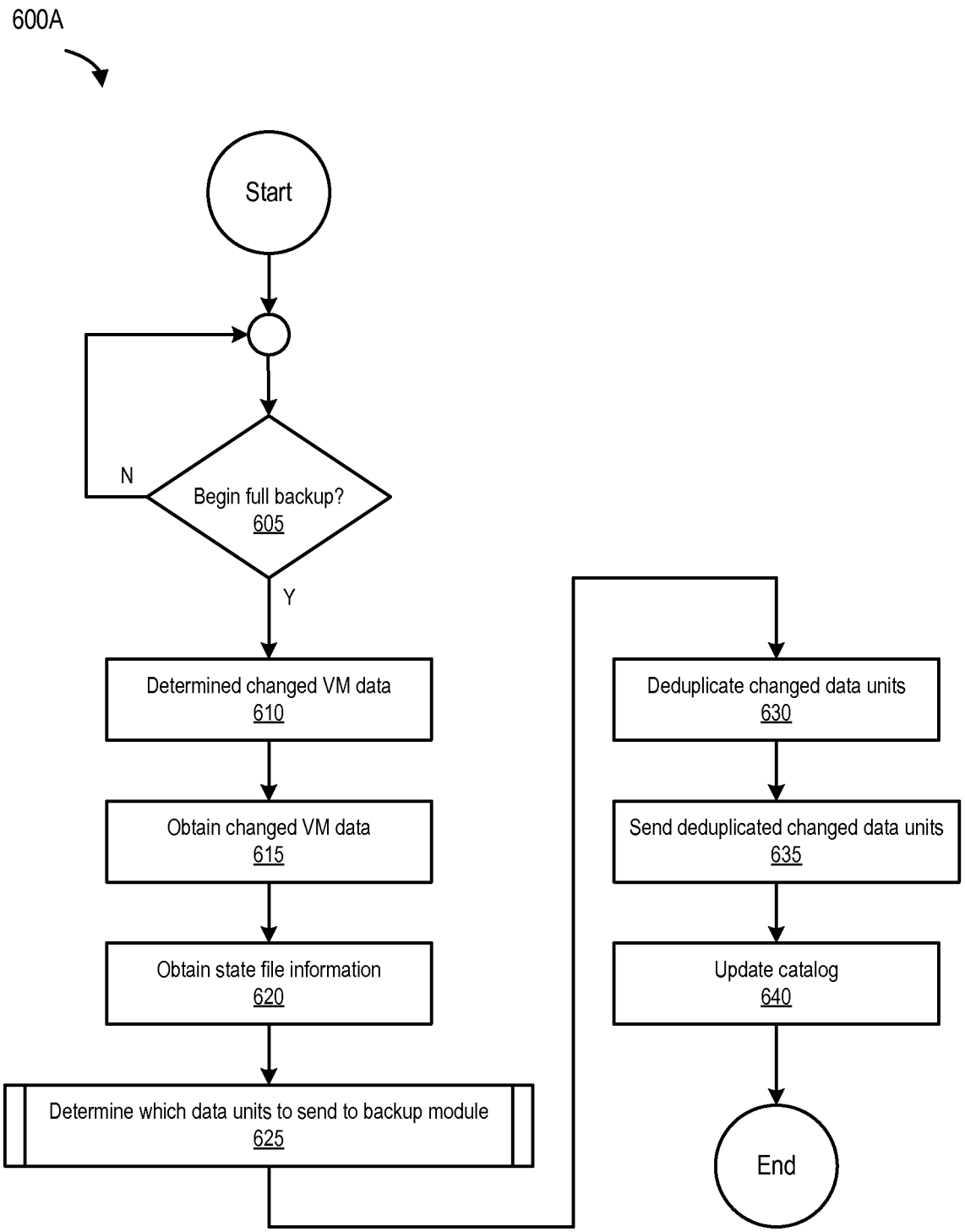
FIG. 6A is a flowchart that illustrates a process for determining which units of data to send to a media server for backup, according to one embodiment of the present disclosure.

FIG. 6A is a flowchart that illustrates a process for determining which units of data to send to a media server for backup, according to one embodiment. The process begins at 605 by determining if a full backup should be started. If so, at 610, the process determines changed virtual machine data (e.g., by accessing changed block tracker 135). At 615, the process obtains the changed virtual machine data (e.g., from local storage 220 and/or hypervisor 120). At 620, the process obtains state file information, and at 625, determines which data units to send to backup module 340 (e.g., based on the data units already in original full backup image 155 as indicated by state file information). At 630, the process deduplicates the changed data units (e.g., using deduplication module 315 as shown in FIG. 3), and at 635, sends the deduplicated changed data units (e.g., to media server 165). The process ends at 640 by updating catalog 325.

Figure 6B:
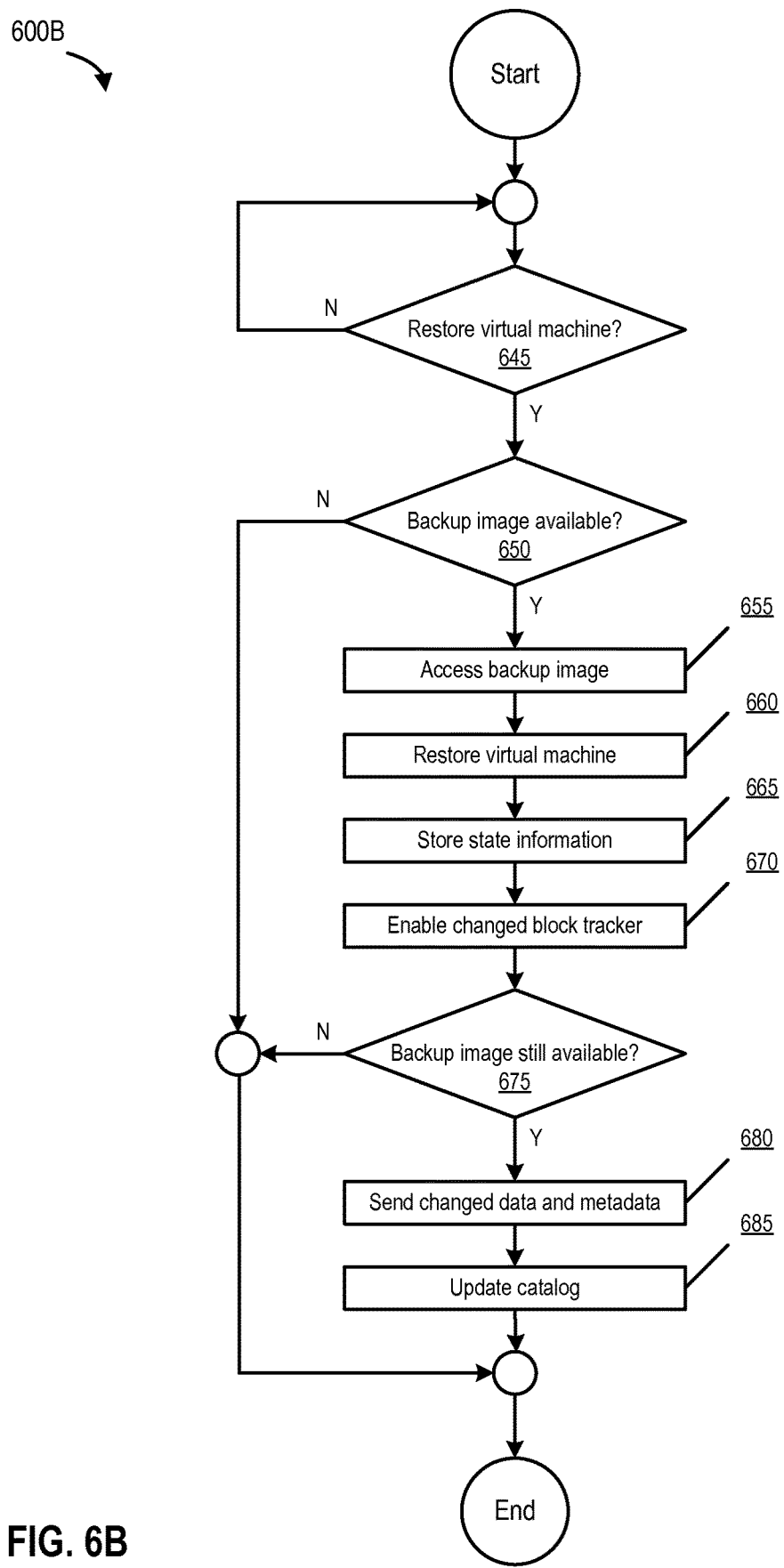
FIG. 6B is a flowchart that illustrates a process for sending data from a hypervisor to a media server, according to one embodiment of the present disclosure.

FIG. 6B is a flowchart that illustrates a process for sending data from a hypervisor to a backup module after restoring a virtual machine from a backup image, according to one embodiment. The process begins at 645 by determining whether a virtual machine has to be restored. If the virtual machine has to be restored, the process, at 650, determines whether a backup image is available. If a backup image is available, the process, at 655, accesses the backup image. At 660, the process restores the virtual machine, and at 665, stores state information. At 670, the process enables the changed block tracker. At 675, the process determines if the backup image is still available (e.g., whether original full backup image 155 is still available on media server 165). If the backup is still available, the process, at 680, sends changed data and metadata, and at 685, ends by updating the catalog.

Figure 7A:
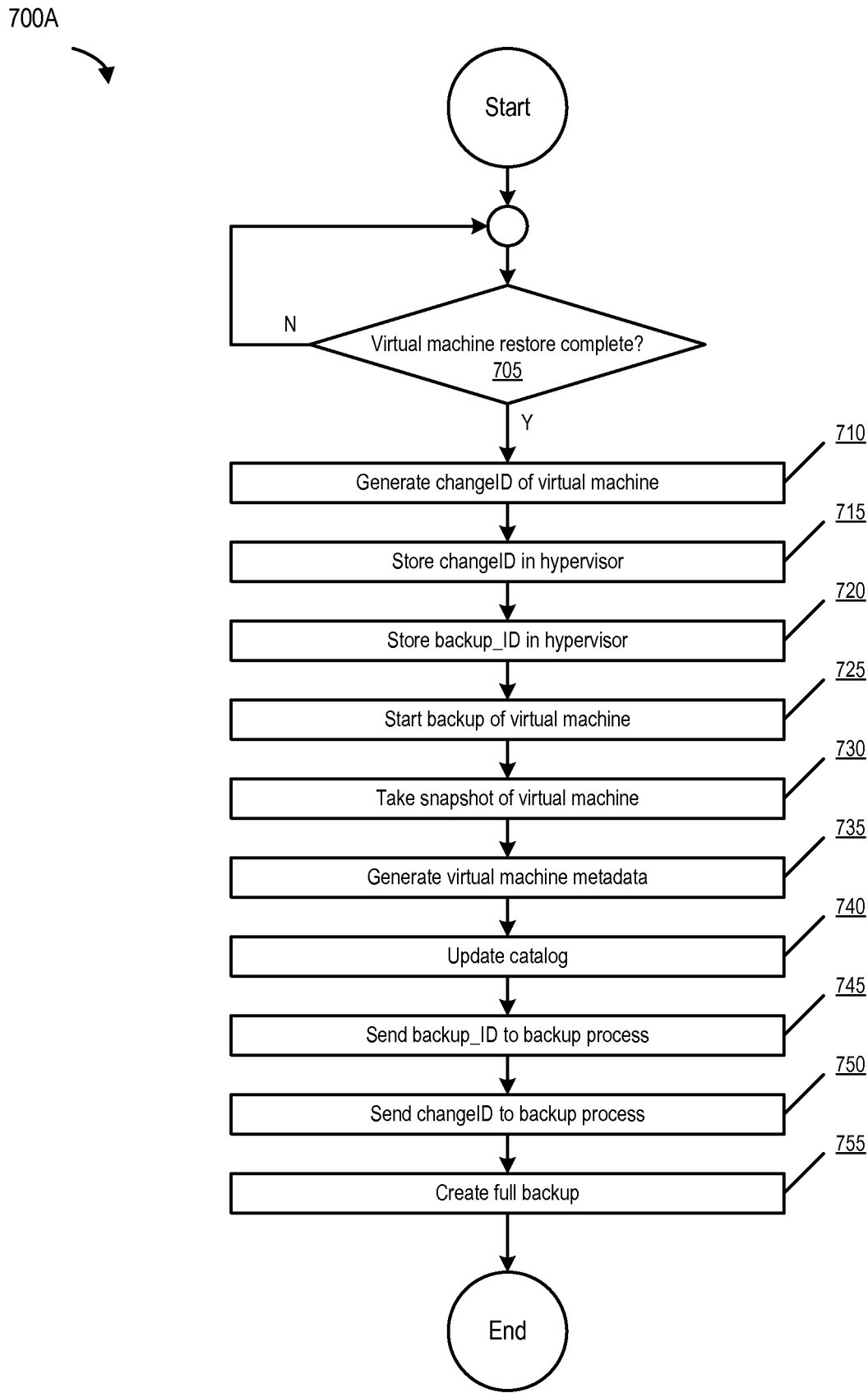
FIG. 7A is a flowchart that illustrates a process for creating a consolidated full backup of a restored virtual machine, according to one embodiment of the present disclosure.

FIG. 7A is a flowchart that illustrates a process for creating a consolidated full backup of a restored virtual machine, according to one embodiment. The process begins at 705 by determining whether a restore process of a virtual machine is complete (e.g., from original full backup image 155 and a backup policy into virtual machine 125(1)). If the restore process is not complete, the process waits for the restore process to complete. If the restore of the virtual machine is complete, the process, at 710, generates (and stores) a changeID of the restored virtual machine.

The changeID of a virtual disk for a corresponding snapshot or virtual machine can be used to track changes to a virtual disk (e.g., to virtual disk 130(1) associated with virtual machine 125(1)). The changeID is an identifier that refers to a point (in the past) that can be used as the point in time at which to begin including changes to a virtual disk (e.g., using changed block tracker 135). Backup software 150 can also obtain the changeID from a virtual disk's backing information when performing a backup. When another backup is to be performed (e.g., consolidated full backup 160), the changeID can be used to obtain a list of changed areas of a virtual disk (e.g., a list of each extent of changed data on a virtual disk and/or block map information of files in the virtual disk).

At 720, the process stores a backup_ID in hypervisor 120. At 725, the process starts a backup of the virtual machine (e.g., at a time after the virtual machine is restored, booted up, and is operational). At 730, the process takes a snapshot of the virtual disk(s) associated with the virtual machine, and at 735, generates VM metadata (e.g., VM metadata 230). At this point, in addition to virtual machine metadata, an extent file is also generated (e.g., NBU_DATA.xml, although other types and/or formats of extent files are also contemplated). The extent file can be used during a backup operation to refer to the parameters that may be required to backup a virtual machine (e.g., the number of virtual disks, the name of the virtualization server, the changeID, etc.). The extent file name contains the extent information of the files in the virtual disk(s) associated with the virtual machine that are part of the previous backup (e.g., original full backup image 155). The extent information can include, but is not limited to, the name of the virtual disk(s), the backup_ID, name of one or more backup policies, a starting offset, and the length of the extent, object information, and the like, etc.

In this manner, when a backup of a (restored) virtual machine starts, a backup host (e.g., backup server 145 or hypervisor 120) can identify units of data that have been changed since the restore of the virtual machine. During a subsequent full backup (e.g., to create consolidated full backup 160), the backup host can refer to the aforementioned extent file to identify and retrieve units of unchanged data, thus needing to transfer only header information for the units of unchanged data, as well as units of changed data (and associated metadata) to the backup module to create the consolidated full backup.

Therefore, after generating the virtual machine metadata and the extent information (e.g., state information), the process updates the virtual machine's change_ID (generated in 710) in the extent file, and at 740, updates the catalog. At 745 and 750, the process sends the backup_ID (e.g., of original full backup image 155), and the change_ID (of the restored virtual machine), to the backup process, respectively (e.g., so that units of changed data can be generated in media server 165 using the change_ID stored in NBU_DATA.xml, at least in one embodiment) since the time the virtual machine has been restored.

At 755, the process ends by creating a full backup by reading only the units of changed data sent to backup module 340 from hypervisor 120 (or backup server 145). For units of unchanged data, the process refers to original full backup image 155, as well as to the block map information stored in files related to original full backup image 155 (thus, requiring the transmission of only the headers for original full backup image 155 to media server 165).

Figure 7B:
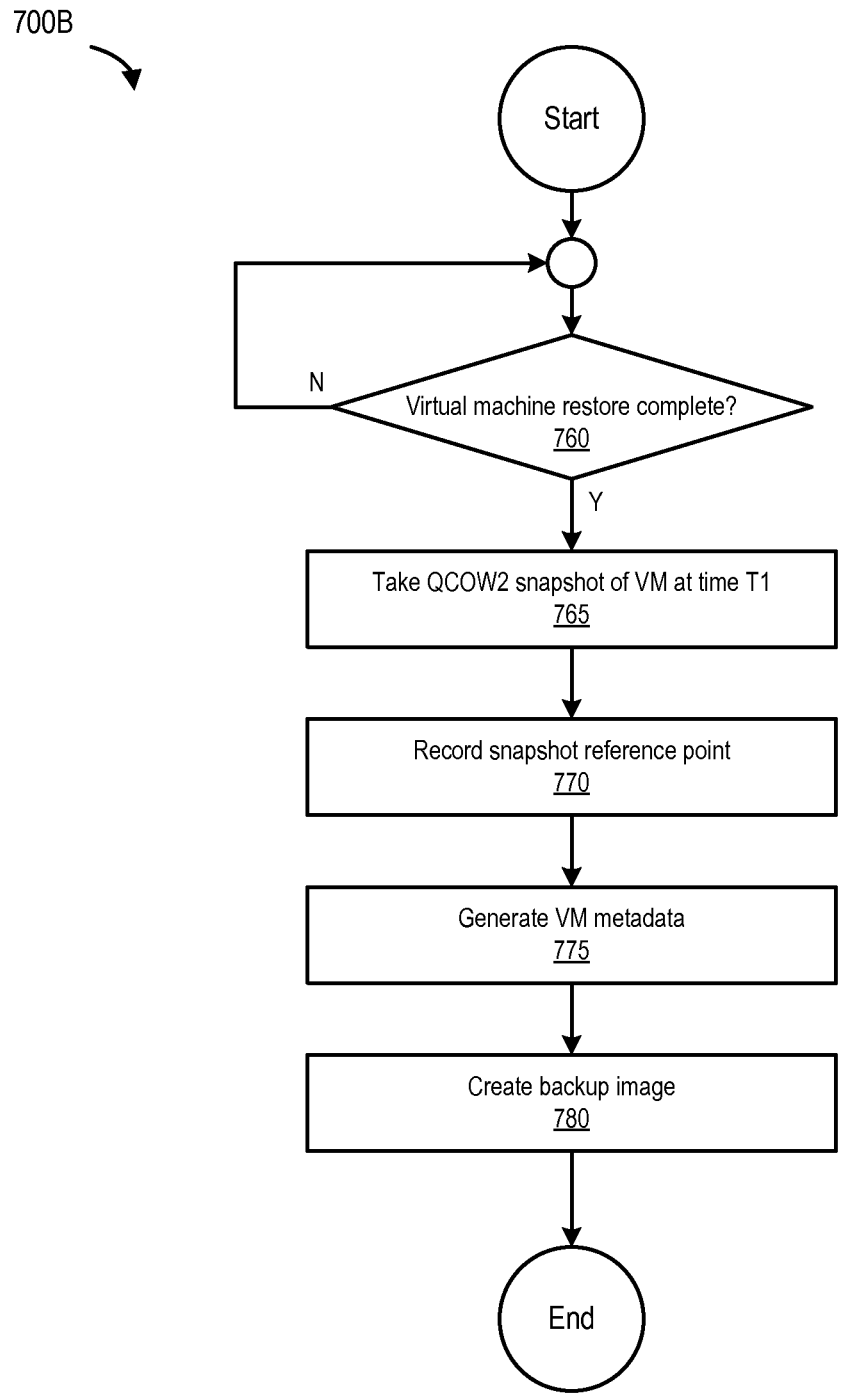
FIG. 7B is a flowchart that illustrates another process for creating a consolidated full backup of a restored virtual machine, according to one embodiment of the present disclosure.

FIG. 7B is a flowchart that illustrates another process for creating a consolidated full backup of a restored virtual machine, according to one embodiment. The process begins at 760 by determining whether a restore process of a virtual machine is complete (e.g., from original full backup image 155 and a backup policy into virtual machine 125(1)). If the restore process is not complete, the process waits for the restore process to complete. If the restore of the virtual machine is complete, the process, at 765, takes a QCOW2 snapshot of the virtual machine at time T1. At 770, the process records a snapshot reference point. At 775, the process generates virtual machine metadata.

In some embodiments, the virtual machine metadata includes, but is not limited to, metadata including the name of the virtual machine, the name of the virtual disk(s), and information required for restoring the virtual machine, as previously noted. In such embodiments, the virtual machine metadata can also include the snapshot reference point recorded at 770 (e.g., to create consolidated full backup 160). The metadata can further include catalog information that is generated (of the restored virtual machine). At 755, the process ends by creating a full backup image. The full backup image in this example contains only the catalog, whereas the virtual disk(s) associated with the virtual machine point to original full backup image 155 that the virtual machine is restored from (e.g., at time T1).

It should be noted that, in one embodiment, the snapshot generated at time T1 (in 765) is preserved to identify units of changed data (this snapshot can be deleted after consolidated full backup 160 is created). In this example, the snapshot is taken when the creation of consolidated full backup 160 starts. Catalog information is then generated for the virtual machine. The snapshot reference point (770) can then be used to identify units of changed data since the virtual machine has been restored. Therefore, only the units of changed data are read from the virtual disk(s) and sent to media server 165. For units of unchanged data, backup software 150 can refer to the block map information stored in files related to original full backup image 155 (e.g., the backup image the virtual machine is restored from), and thus needs to transmit only the headers for the units of unchanged data to media server 165 to create consolidated full backup 160 (which, in another embodiment, can be used to restore one or more other virtual machine(s) as consolidated full backup 160 is a full backup).

An Example Computing Environment

Figure 8:
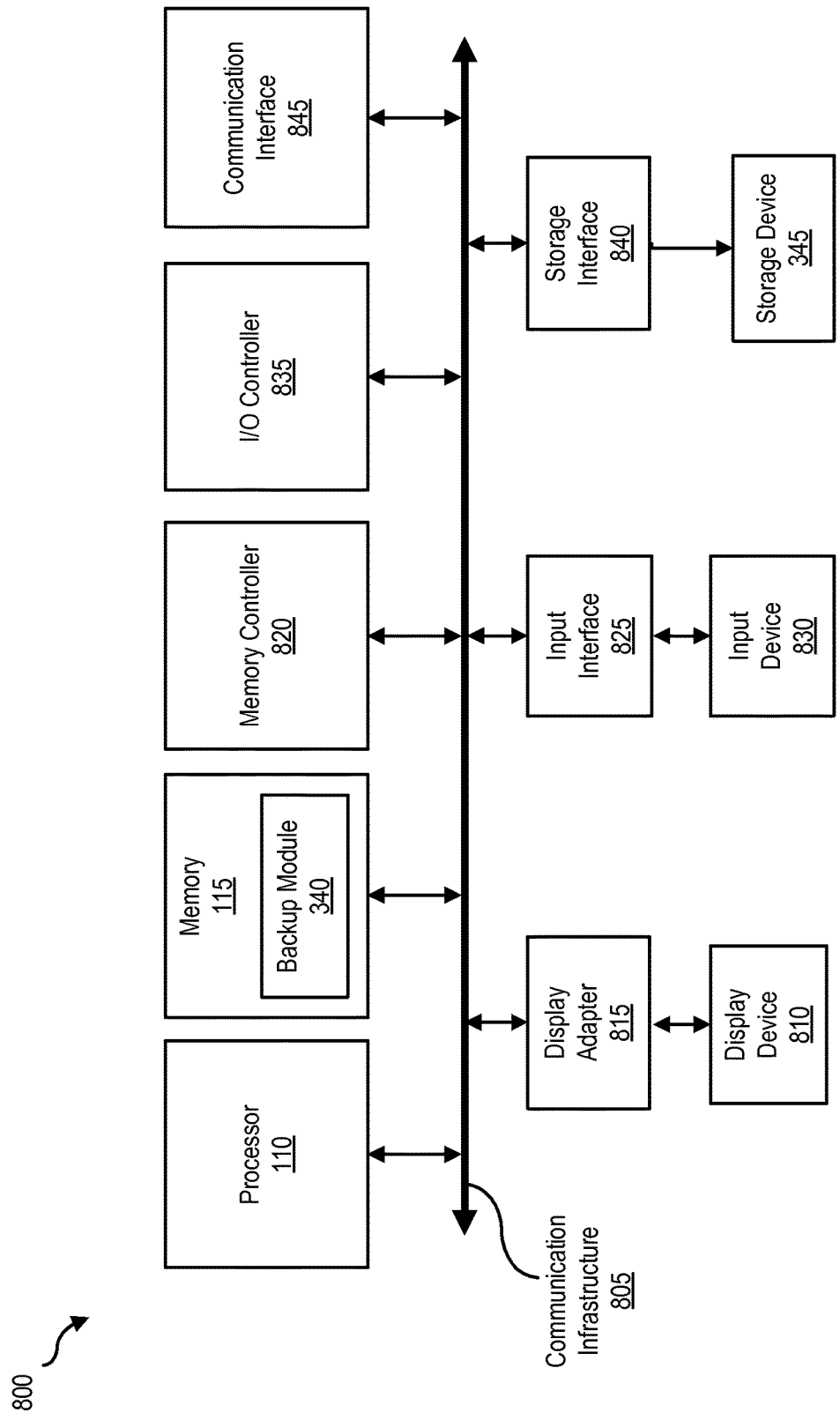
FIG. 8 is a block diagram of a computing system, illustrating how a backup module can be implemented in software, according to one embodiment of the present disclosure.

FIG. 8 is a block diagram of a computing system, illustrating how a backup module can be implemented in software, according to one embodiment of the present disclosure. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 110 and a memory 115. By executing the software that implements computing device 105 and virtualization server 205, computing system 800 becomes a special purpose computing device that is configured to create a consolidated full backup of a restored virtual machine.

Processor 110 generally represents any type or form of processing unit capable of processing data or interpreting and executing instructions. In certain embodiments, processor 110 may receive instructions from a software application or module. These instructions may cause processor 110 to perform the functions of one or more of the embodiments described and/or illustrated herein. For example, processor 110 may perform and/or be a means for performing all or some of the operations described herein. Processor 110 may also perform and/or be a means for performing any other operations, methods, or processes described and/or illustrated herein.

Memory 115 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a backup module 340 may be loaded into memory 115.

In certain embodiments, computing system 800 may also include one or more components or elements in addition to processor 110 and memory 115. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 110, memory 115, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 110, memory 115, communication interface 845, display adapter 815, input interface 825, and storage interface 840.

Communication interface 845 broadly represents any type or form of communication device or adapter capable of facilitating communication between computing system 800 and one or more additional devices. For example, in certain embodiments communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. In at least one embodiment, communication interface 845 may provide a direct connection to a remote server via a direct link to a network, such as the Internet. Communication interface 845 may also indirectly provide such a connection through, for example, a local area network (such as an Ethernet network), a personal area network, a telephone or cable network, a cellular telephone connection, a satellite data connection, or any other suitable connection.

In certain embodiments, communication interface 845 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing. For example, communication interface 845 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG. 8, computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include storage device 345 to communication infrastructure 805 via a storage interface 840. Storage device 850 generally represents any type or form of storage devices or mediums capable of storing data and/or other computer-readable instructions. For example, storage device 345 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 345, and other components of computing system 800.

In certain embodiments, storage device 345 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 850 may also include other similar structures or devices for allowing computer software, data, or other computer-readable instructions to be loaded into computing system 800. For example, storage device 345 may be configured to read and write software, data, or other computer-readable information. Storage device 345 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 115 and/or various portions of storage device 850. When executed by processor 110, a computer program loaded into computing system 800 may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
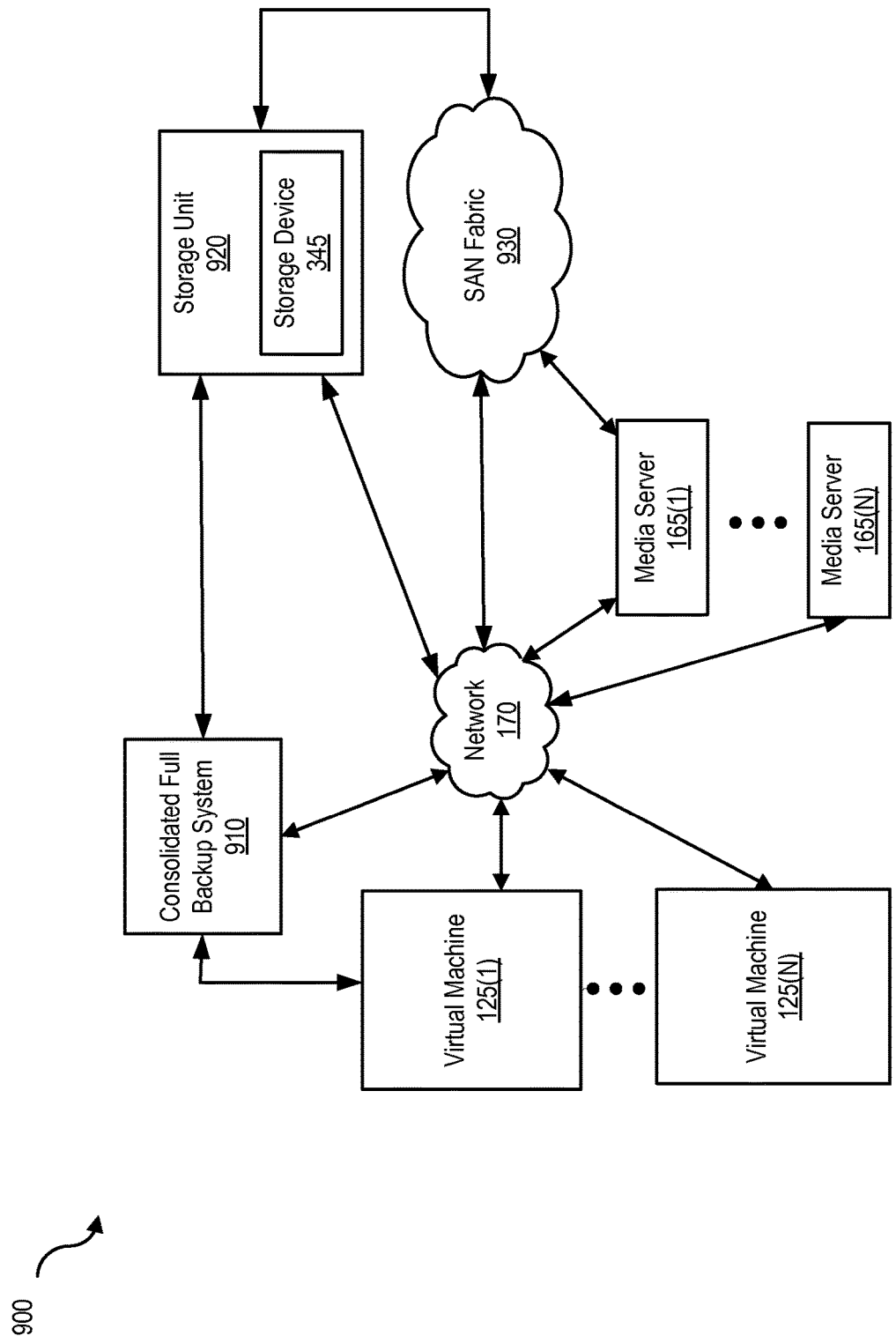
FIG. 9 is a block diagram of a networked system, illustrating how various computing devices can communicate via a network, according to one embodiment of the present disclosure.

FIG. 9 is a block diagram of a networked system, illustrating how various computing devices can communicate via a network, according to one embodiment of the present disclosure. In certain embodiments, network-attached storage (NAS) devices may be configured to communicate with virtualization server 105 using various protocols, such as Network File System (NFS), Server Message Block (SMB), or Common Internet File System (CIFS).

Network 170 generally represents any type or form of computer network or architecture capable of facilitating communication between multiple computing devices. Network 170 may facilitate communication between virtualization server 205, backup server 145, and media server 165. In certain embodiments, and with reference to computing system 800 of FIG. 8, a communication interface, such as communication interface 845 in FIG. 8, may be used to provide connectivity between virtualization server 205 and network 170. It should be noted that the embodiments described and/or illustrated herein are not limited to the Internet or any particular network-based environment. For example, network 170 can be a Storage Area Network (SAN).

In at least one embodiment, all or a portion of one or more of the embodiments disclosed herein may be encoded as a computer program and loaded onto and executed by virtualization server 205, backup server 145, media server 165, or any combination thereof. All or a portion of one or more of the embodiments disclosed herein may also be encoded as a computer program, stored on virtualization server 205, backup server 145, media server 165, and distributed over network 170.

In some examples, all or a portion of the computing device in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, virtualization server 205, backup server 145, and/or media server 165 may transform behavior of a computing device in order to create a consolidated full backup of a restored virtual machine.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   restoring a virtual machine from an original full backup image to create a restored virtual machine;
   subsequent to restoring the virtual machine, creating a snapshot of the restored virtual machine;
   subsequent to the restoring of the virtual machine and the creating of the snapshot of the restored virtual machine, executing the restored virtual machine;
   subsequent to the restoring of the virtual machine, the creating of the snapshot of the restored virtual machine, and the executing of the restored virtual machine, identifying one or more units of changed data and metadata associated with the one or more units of changed data, wherein
      the one or more units of changed data were changed by the restored virtual machine during the executing of the restored virtual machine,
      the one or more units of changed data were identified by the restored virtual machine comparing current state information to the snapshot of the restored virtual machine,
      the one or more units of changed data and the metadata associated with the one or more units of changed data are received from a hypervisor at a backup module,
      the hypervisor supports the restored virtual machine, and
      the restored virtual machine employs one or more virtual disks;
   subsequent to the restoring of the virtual machine, the creating of the snapshot of the restored virtual machine, the executing of the restored virtual machine, and the identifying of the one or more units of changed data and the metadata associated with the one or more units of changed data, creating a backup of the one or more virtual disks used by the restored virtual machine, wherein
the backup of the one or more virtual disks is based, at least in part, on the original full backup image and, at least in part, on the one or more units of changed data; and
sending a confirmation to the hypervisor, wherein
the confirmation is sent from the backup module, and
the confirmation indicates that the backup of the one or more virtual disks has been created.

2. The computer-implemented method of claim 1, further comprising:
identifying the one or more units of changed data using a changed block tracker, wherein
the hypervisor implements the changed block tracker, and
the changed block tracker determines that the one or more units of changed data have been modified by the restored virtual machine; and
storing the metadata associated with the one or more units of changed data in the hypervisor.

3. The computer-implemented method of claim 1, wherein
the original full backup image is stored on a media server,
a catalog and a state file associated with the virtual machine are also stored on the media server during the restoring, and
the restoring further comprises enabling a changed block tracker on the hypervisor, wherein
the changed block tracker is enabled after completion of the restoring and prior to initiating execution of the restored virtual machine.

4. The computer-implemented method of claim 3, further comprising:
synthesizing a consolidated full backup.

5. The computer-implemented method of claim 4, wherein the synthesizing the consolidated full backup further comprises:
generating a snapshot of the restored virtual machine;
accessing the catalog and the state file on the media server;
generating backup metadata from the catalog and the state file; and
creating the consolidated full backup by combining the one or more units of changed data transmitted from the hypervisor with one or more units of unchanged data from the original full backup image identified by the backup metadata.

6. The computer-implemented method of claim 5, further comprising:
deleting the original full backup image after creating the consolidated full backup, and
designating the consolidated full backup as a new full backup image to be used for a subsequent restore operation.

7. The computer-implemented method of claim 5, wherein the backup metadata comprises:
information used to restore the virtual machine stored in the catalog; and
a state of the virtual machine at a time the restoring is performed stored in the state file.

8. The computer-implemented method of claim 5, wherein
the one or more units of unchanged data in the original full backup image is identified by comparing the snapshot of the virtual machine taken after the restoring with the catalog stored as part of the restoring.

9. A system comprising:
one or more processors; and
a memory coupled to the one or more processors, wherein the memory stores program instructions executable by the one or more processors to perform a method comprising:
restoring a virtual machine from an original full backup image to create a restored virtual machine;
subsequent to restoring the virtual machine, creating a snapshot of the restored virtual machine;
subsequent to the restoring of the virtual machine and the creating of the snapshot of the restored virtual machine, executing the restored virtual machine;
subsequent to the restoring of the virtual machine, the creating of the snapshot of the restored virtual machine, and the executing of the restored virtual machine, identifying one or more units of changed data and metadata associated with the one or more units of changed data, wherein
the one or more units of changed data were changed by the restored virtual machine during the executing of the restored virtual machine,
the one or more units of changed data were identified by the restored virtual machine comparing current state information to the snapshot of the restored virtual machine,
the one or more units of changed data and the metadata associated with the one or more units of changed data are received from a hypervisor at a backup module,
the hypervisor supports the restored virtual machine, and
the restored virtual machine employs one or more virtual disks;
subsequent to the restoring of the virtual machine, the creating of the snapshot of the restored virtual machine, the executing of the restored virtual machine, and the identifying of the one or more units of changed data and the metadata associated with the one or more units of changed data, creating a backup of the one or more virtual disks used by the restored virtual machine, wherein
the backup of the one or more virtual disks is based, at least in part, on the original full backup image and, at least in part, on the one or more units of changed data; and
sending a confirmation to the hypervisor, wherein
the confirmation is sent from the backup module, and
the confirmation indicates that the backup of the one or more virtual disks has been created.

10. The system of claim 9, wherein the method further comprises:
identifying the one or more units of changed data using a changed block tracker, wherein the hypervisor implements the changed block tracker, and
the changed block tracker determines that the one or more units of changed data have been modified by the restored virtual machine; and
storing the metadata associated with the one or more units of changed data in the hypervisor.

11. The system of claim 10, wherein
the original full backup image is stored on a media server,
a catalog and a state file associated with the virtual machine are also stored on the media server during the restoring, and the restoring further comprises enabling a changed block tracker on the hypervisor, wherein
the changed block tracker is enabled after completion of the restoring and prior to initiating execution of the restored virtual machine.

12. The system of claim 11, wherein the method further comprises:
synthesizing a consolidated full backup, wherein the synthesizing the consolidated full backup further comprises:
generating a snapshot of the restored virtual machine;
accessing the catalog and the state file on the media server;
generating backup metadata from the catalog and the state file; and
creating the consolidated full backup by combining the one or more units of changed data transmitted from the hypervisor with one or more units of unchanged data from the original full backup image identified by the backup metadata.

13. The system of claim 12, wherein the method further comprises:
deleting the original full backup image after creating the consolidated full backup, and
designating the consolidated full backup as a new full backup image to be used for a subsequent restore operation.

14. The system of claim 12, wherein
the backup metadata comprises:
information used to restore the virtual machine stored in the catalog, and
a state of the virtual machine at a time the restoring is performed stored in the state file, and
the one or more units of unchanged data in the original full backup image is identified by comparing the snapshot of the virtual machine taken after the restoring with the catalog stored as part of the restoring.

15. A non-transitory computer readable storage medium comprising program instructions executable to perform a method comprising:
restoring a virtual machine from an original full backup image to create a restored virtual machine;
subsequent to restoring the virtual machine, creating a snapshot of the restored virtual machine;
subsequent to the restoring of the virtual machine and the creating of the snapshot of the restored virtual machine, executing the restored virtual machine;
subsequent to the restoring of the virtual machine, the creating of the snapshot of the restored virtual machine, and the executing of the restored virtual machine, identifying one or more units of changed data and metadata associated with the one or more units of changed data, wherein
the one or more units of changed data were changed by the restored virtual machine during the executing,
the one or more units of changed data were changed by the restored virtual machine during the executing of the restored virtual machine, the one or more units of changed data were identified by the restored virtual machine comparing current state information to the snapshot of the restored virtual machine,
the restored virtual machine is supported by a hypervisor, and
the restored virtual machine employs one or more virtual disks;
subsequent to the restoring of the virtual machine, the creating of the snapshot of the restored virtual machine, the executing of the restored virtual machine, and the identifying of the one or more units of changed data and the metadata associated with the one or more units of changed data, creating a backup of the one or more virtual disks used by the restored virtual machine, wherein
the backup of the one or more virtual disks is based, at least in part, on the original full backup image and, at least in part, on the one or more units of changed data; and
sending a confirmation to the hypervisor, wherein
the confirmation is sent from a backup module, and
the confirmation indicates that the backup of the one or more virtual disks has been created.

16. The non-transitory computer readable storage medium of claim 15, wherein the method further comprises:
identifying the one or more units of changed data using a changed block tracker, wherein
the hypervisor implements the changed block tracker, and
the changed block tracker determines that the one or more units of changed data have been modified by the restored virtual machine; and
storing the metadata associated with the one or more units of changed data in the hypervisor.

17. The non-transitory computer readable storage medium of claim 16, wherein the original full backup image is stored on a media server,
a catalog and a state file associated with the virtual machine are also stored on the media server during the restoring, and
the restoring further comprises enabling a changed block tracker on the hypervisor, wherein
the changed block tracker is enabled after completion of the restoring prior to initiating execution of the restored virtual machine.

18. The non-transitory computer readable storage medium of claim 17, wherein the method further comprises:
synthesizing a consolidated full backup, wherein
the synthesizing the consolidated full backup comprises:
generating a snapshot of the restored virtual machine;
accessing the catalog and the state file on the media server;
generating backup metadata from the catalog and the state file; and
creating the consolidated full backup by combining the one or more units of changed data transmitted from the hypervisor with one or more units of unchanged data from the original full backup image identified by the backup metadata.

19. The non-transitory computer readable storage medium of claim 18, wherein the method further comprises further comprising:
deleting the original full backup image after creating the consolidated full backup, and designating the consolidated full backup as a new full backup image to be used for a subsequent restore operation.

20. The non-transitory computer readable storage medium of claim 18, wherein
the backup metadata comprises:
information used to restore the virtual machine stored in the catalog, and
a state of the virtual machine at a time the restoring is performed stored in the state file, and the one or more units of unchanged data in the original full backup image is identified by comparing the snapshot of the virtual machine taken after the restoring with the catalog stored as part of the restoring.

\* \* \* \* \*